Dec. 10, 1968     W. H. PRICE     3,415,592
LINEAR MOTION ZOOM OBJECTIVE
Filed March 1, 1965     2 Sheets-Sheet 1

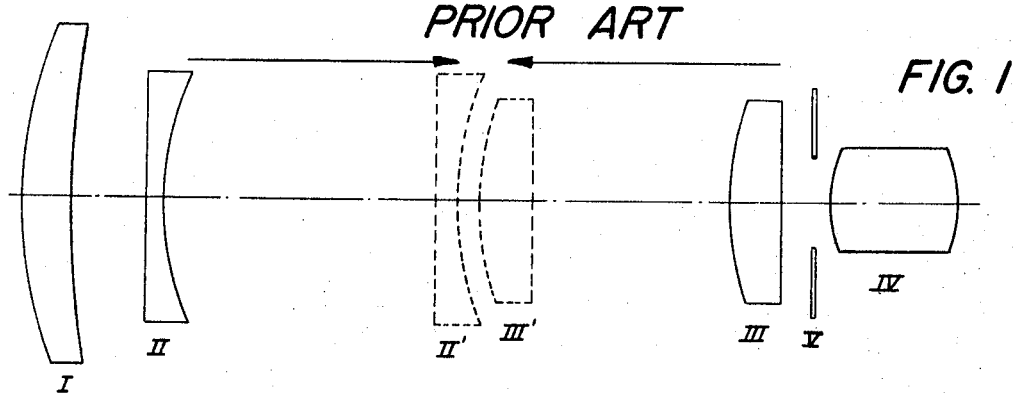

FIG. 1

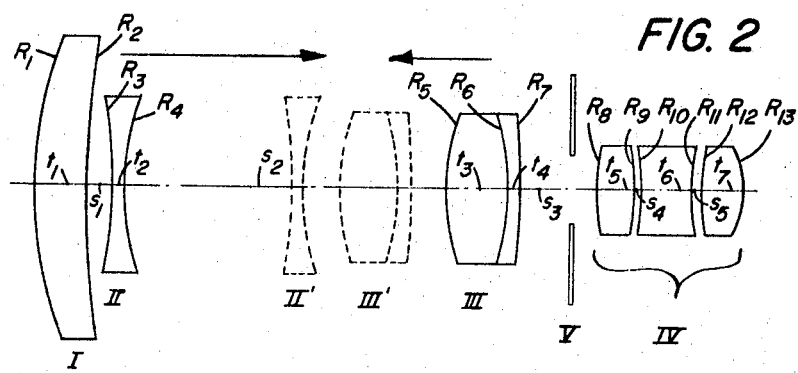

| FOCAL LENGTH = 66.7mm TO 150mm | | | | f/2 |
|---|---|---|---|---|
| LENS ELEMENT | $N_1 - N_7$ | $V_1 - V_7$ | RADIUS | THICKNESS OR SEPARATION |
| 1 | $N_1 = 1.61$ | $V_1 = 58.8$ | $R_1 = +194$ mm | $t_1 = 18.4$ mm |
|   |   |   | $R_2 = +1180$ | $s_1 = 86.4$ to 8.3 |
| 2 | $N_2 = 1.57$ | $V_2 = 57.4$ | $R_3 = -370$ | $t_2 = 6.34$ |
|   |   |   | $R_4 = +101$ | |
| 3 | $N_3 = 1.70$ | $V_3 = 56.2$ | $R_5 = +123$ | $s_2 = 16.0$ to 133 |
| 4 | $N_4 = 1.69$ | $V_4 = 30.9$ | $R_6 = -89.5$ | $t_3 = 22.2$ |
|   |   |   | $R_7 = -474$ | $t_4 = 5.55$ |
|   |   |   |   | $s_3 = 68.2$ to 29.2 |
| 5 | $N_5 = 1.62$ | $V_5 = 55.1$ | $R_8 = +73.5$ | $t_5 = 14.3$ |
|   |   |   | $R_9 = -266$ | $s_4 = 2.33$ |
| 6 | $N_6 = 1.62$ | $V_6 = 36.6$ | $R_{10} = -90.6$ | $t_6 = 26.2$ |
|   |   |   | $R_{11} = +53.1$ | $s_5 = 1.78$ |
| 7 | $N_7 = 1.61$ | $V_7 = 58.8$ | $R_{12} = +93.2$ | $t_7 = 16.0$ |
|   |   |   | $R_{13} = -65.0$ | |

WILLIAM H. PRICE
INVENTOR.
BY R. Frank Smith
Leonard O. Treash Jr.
ATTORNEYS

Dec. 10, 1968 W. H. PRICE 3,415,592
LINEAR MOTION ZOOM OBJECTIVE
Filed March 1, 1965 2 Sheets-Sheet 2

WILLIAM H. PRICE
INVENTOR.

BY *R. Frank Smith*
*Leonard W. Treash Jr.*
ATTORNEYS

United States Patent Office 3,415,592
Patented Dec. 10, 1968

3,415,592
LINEAR MOTION ZOOM OBJECTIVE
William H. Price, Rochester, N.Y., assignor to Eastman Kodak Company, Rochester, N.Y., a corporation of New Jersey
Filed Mar. 1, 1965, Ser. No. 435,873
6 Claims. (Cl. 350—184)

ABSTRACT OF THE DISCLOSURE

Particular lens parameters are provided which give good corrections in a zoom objective in which a second negative component and a third positive component move in opposite directions at rates having a linear ratio of approximately two to one.

---

This invention relates to zoom objectives. More particularly, it relates to zoom objectives with two moving components whose respective distances of movement vary linearly with each other. Herein such objectives sometimes will be referred to as linear motion objectives.

The most simple of prior linear motion objectives are generally of two types. In each type there are four components including a relay as the fourth component. The second component is negative, and the others are positive. In the most common type, the first and third components move equal distances in the same direction and thus can be connected by a rigid member. In the other type the second and third components move equal distances in opposite directions and can be driven together with a single reversing lever or gear system. Objectives of either type are optically compensated for focus shift during zooming and require an inexpensive zooming mechanism. At the same time they are capable of fairly good corrections over a moderate zoom range.

Such linear motion objectives generally have the limitation that substantial space is required to move two separate components equal distances. Thus, such objectives lack compactness, both in overall length and in element diameter. Objectives of the so-called mechanically compensated type can be designed which are more compact because of the very small displacement of the compensating zoom component. However, such objectives require a much more complicated zoom mechanism because of the non-linearity of the compensating motion.

To solve the problem of providing compactness with a simple zoom mechanism, zoom objectives have been designed in which the second and third components move linearly in opposite directions but at different comparative rates, for example, 2.2 to 1. Such zoom lenses, despite containing a large number of elements, have generally been poorly corrected at a large number of points over the zooming range.

It is an object of this invention to provide a zoom objective of the linear motion type which has all of the previously mentioned advantages of prior linear motion objectives, especially the advantages of adaptability to a simple zoom mechanism and general design compactness available with such 2.2 to 1 designs but is substantially improved in optical performance over prior opposed linear motion designs.

According to the invention, such a zoom objective is designed according to parameters more fully set forth below in a design having a comparative movement ratio of 2 to 1.

In the drawings:

FIG. 1 is a diagrammatic axial cross section of an objective made according to prior art.

FIGS. 2 and 4 are diagrammatic axial cross sections of objectives made according to the invention.

FIG. 3 is a chart of specifications for an objective made according to FIG. 2.

Figure 5:
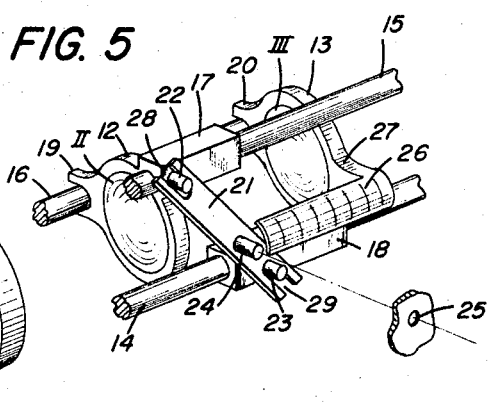
FIG. 5 is a partially exploded perspective view of a mechanism for zooming an objective made according to the invention.

For all purposes herein, from front to rear, the components are numbered from I to IV, the lens elements from 1 to 7, the radii from $R_1$ to $R_{13}$, the air spacings from $S_1$ to $S_5$, and the thicknesses from $t_1$ to $t_7$. The indexes of refraction are for the D line of the spectrum and, from front to rear, are numbered from $N_1$ to $N_7$. The dispersive indexes are similarly numbered from $V_1$ to $V_7$. Details of the elements making up the components in FIGS. 1 and 5 are not shown.

In all figures, component I is positive and is moved, if at all, only for focusing. Components II and III are negative and positive, respectively, and are moved in opposite directions for zooming. Component IV is a stationary positive relay and is not shown in FIG. 5. In FIGS. 1 and 2 components II′ and III′ represent components II and III when zoomed to the telephoto position.

According to FIG. 1, prior art zoom objectives move components II and III at equal rates in opposite directions to effect zooming. Such objectives are optically compensated for focus shift, with the image passing through an intermediate focal plane three times.

According to FIG. 2, the powers of the components are chosen so that a result essentially the same as FIG. 1 objectives in terms of optical compensation is obtained although component III moves a shorter distance than component II. Because the relation between the distances moved is kept linear, essentially the same simple mechanism can be used to effect zooming.

As will be discussed in more detail in the examples, both the overall length and the diameters of elements of the objective of FIG. 2 are considerably less than the objective of FIG. 1 when made in comparable focal lengths.

Figure 4:
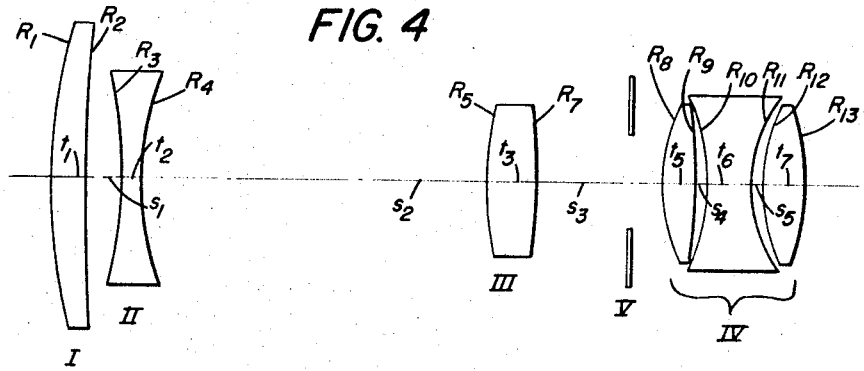

The embodiment of the objective according to FIG. 4 operates on the same principle as that of FIG. 2 but certain of the elements have been altered to reduce cost.

In FIG. 5 is disclosed a simple, low-cost, zoom mechanism adaptable to work with a linear opposed motion zoom system made according to the invention. According to FIG. 5, components I, II and III are held by lens holders 10, 12 and 13. Lens holder 10 is attached to the ends of three slide rods 14, 15 and 16 by means not shown. Component I may be movable to adjust focus by any of several well-known means, also not shown. Sleeves 17 and 18 on lens holders 12 and 13 are allowed to slide on slide rods 14 and 15. Components II and III are kept in axial alignment by two yokes 19 and 20 which are allowed to slide on slide rod 16. Two pins 22 and 23 positioned on sleeves 17 and 18 are inserted in two slots 28 and 29 in the ends of a linking lever 21. Said linking lever 21 is allowed to pivot around a pivot pin 24 held fixed in a part of a camera casing 25. A thumb slide 26 is connected to lens holder 13 by an arm 27.

As thumb slide 26 is moved forward moving component III forward, linking lever 21 pivots about pivot pin 24 and causes component II to move rearward. The ratio of the distance moved by component III to the distance moved by component II is equal to the ratio of the distances between pin 24 and pins 23 and 22, respectively. Each of said ratios is constant, giving a linear relationship to the distances moved by the components. Obviously, the zooming force could be applied to component II instead of component III with essentially the same result.

Well-corrected objectives may be made according to the invention by following the specifications in the examples below. In all examples, the geometrical mean between the wide angle and telephoto focal lengths is 100 mm.

EXAMPLE I (FIGS. 2 AND 3)

E.F. from 66.7 mm. to 150 mm.    f/2

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ = +194 | $t_1$=18.4 |
|   |   |           |            | $R_2$ = +1,180 | $S_1$=86.4 to 8.3 |
| II | 2 | $N_2$=1.57 | $V_2$=57.4 | $R_3$ = −370 | $t_2$=6.34 |
|   |   |           |            | $R_4$ = +101 | $S_2$=16.0 to 133 |
|   |   |           |            | $R_5$ = +123 | $t_3$=22.2 |
| III | 3 | $N_3$=1.70 | $V_3$=56.2 | $R_6$ = −89.5 | $t_4$=5.55 |
|   | 4 | $N_4$=1.69 | $V_4$=30.9 | $R_7$ = −474 | $S_3$=68.2 to 29.2 |
|   |   |           |            | $R_8$ = +73.5 | $t_5$=14.3 |
|   | 5 | $N_5$=1.62 | $V_5$=55.1 | $R_9$ = −266 | $S_4$=2.33 |
|   |   |           |            | $R_{10}$ = −90.6 | $t_6$=26.2 |
| IV | 6 | $N_6$=1.62 | $V_6$=36.6 | $R_{11}$ = +53.1 | $S_5$=1.78 |
|   |   |           |            | $R_{12}$ = +93.2 | $t_7$=16.0 |
|   | 7 | $N_7$=1.61 | $V_7$=58.8 | $R_{13}$ = −65.0 |   |

The overall length of an objective made according to Example I is 284 mm. compared to 460 mm. for an objective of the same mean focal length and relative aperture made according to FIG. 1.

The diameters of the front elements are similarly smaller. In Example I the clear aperture diameters of components I, II and III are 112 mm., 77 mm., and 65 mm., respectively. An objective of the same mean focal length and relative aperture and with comparable vignetting made according to FIG. 1 would have clear aperture diameters of 168 mm., 122 mm., and 87 mm., respectively.

Similarly, a lens according to Example I is more compact than comparable linear motion objectives of the same direction motion variety. In addition, it does not have the disadvantage of same direction objectives of a moving front component.

EXAMPLE II

E.F. from 68 mm. to 147 mm.    f/2

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ = +197 | $t_1$=18.8 |
|   |   |           |            | $R_2$ = +1,190 | $S_1$=84 to 8.6 |
| II | 2 | $N_2$=1.57 | $V_2$=57.4 | $R_3$ = −261 | $t_2$=8.2 |
|   |   |           |            | $R_4$ = +118 | $S_2$=21 to 134 |
|   |   |           |            | $R_5$ = +125 | $t_3$=22.6 |
| III | 3 | $N_3$=1.70 | $V_3$=56.2 | $R_6$ = −91.0 | $t_4$=5.5 |
|   | 4 | $N_4$=1.69 | $V_4$=30.9 | $R_7$ = −485 | $S_3$=81.2 to 43.5 |
|   |   |           |            | $R_8$ = +69.4 | $t_5$=13.5 |
|   | 5 | $N_5$=1.62 | $V_5$=55.1 | $R_9$ = −251 | $S_4$=2.4 |
|   |   |           |            | $R_{10}$ = −79.1 | $t_6$=22.0 |
| IV | 6 | $N_6$=1.62 | $V_6$=36.6 | $R_{11}$ = +54.3 | $S_5$=2.8 |
|   |   |           |            | $R_{12}$ = +87.5 | $t_7$=15.1 |
|   | 7 | $N_7$=1.61 | $V_7$=58.8 | $R_{13}$ = −65.5 |   |

EXAMPLE III (FIG. 4)

E.F. from 68 mm. to 147 mm.    f/2.7

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ = +197 | $t_1$=18.8 |
|   |   |           |            | $R_2$ = +1,190 | $S_1$=84 to 8.6 |
| II | 2 | $N_2$=1.57 | $V_2$=42.5 | $R_3$ = −261 | $t_2$=8.2 |
|   |   |           |            | $R_4$ = +118 | $S_2$=22.5 to 135 |
| III | 3 | $N_3$=1.70 | $V_3$=56.2 | $R_5$ = +125 | $t_3$=18.2 |
|   |   |           |            | $R_7$ = −479 | $S_3$=86 to 48.3 |
|   | 5 | $N_5$=1.49 | $V_5$=57.4 | $R_8$ = +55.4 | $t_4$=12.4 |
|   |   |           |            | $R_9$ = −200 | $S_4$=2.9 |
|   |   |           |            | $R_{10}$ = −73.0 | $t_5$=18.2 |
| IV | 6 | $N_6$=1.57 | $V_6$=36.6 | $R_{11}$ = +50.2 | $S_5$=2.9 |
|   |   |           |            | $R_{12}$ = +87.5 | $t_6$=15.9 |
|   | 7 | $N_7$=1.61 | $V_7$=58.8 | $R_{13}$ = −65.5 |   |

Example III is essentially the same as Example II, but with indexes chosen so that plastic elements can be used for elements 5 and 6. Manufacturing cost is further reduced by making component III out of a single type of glass. For acceptable corrections with these materials, relative aperture is closed to f/2.7.

Similarly, more plastic elements may be used in an objective made according to the invention as shown in Examples IV and V.

EXAMPLE IV

E.F. from 66 mm. to 151 mm.    f/3.5

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ = +202 | $t_1$=19.3 |
|   |   |           |            | $R_2$ = +1,220 | $S_1$=93.9 to 11.4 |
| II | 2 | $N_2$=1.57 | $V_2$=36.6 | $R_3$ = −264 | $t_2$=8.5 |
|   |   |           |            | $R_4$ = +119 | $S_2$=11.3 to 136 |
| III | 3 | $N_3$=1.49 | $V_3$=57.4 | $R_5$ = +90.5 | $t_3$=13.4 |
|   |   |           |            | $R_7$ = −342 | $S_3$=72.4 to 31.2 |
|   | 5 | $N_5$=1.49 | $V_5$=57.4 | $R_8$ = +56.6 | $t_5$=12.7 |
|   |   |           |            | $R_9$ = −200 | $S_4$=3.0 |
|   |   |           |            | $R_{10}$ = −74.5 | $t_6$=18.6 |
| IV | 6 | $N_6$=1.57 | $V_6$=36.6 | $R_{11}$ = +51.3 | $S_5$=2.9 |
|   |   |           |            | $R_{12}$ = +89.8 | $t_7$=16.3 |
|   | 7 | $N_7$=1.61 | $V_7$=58.8 | $R_{13}$ = −67.0 |   |

Example IV is similar to Example III, except for substitution of plastic elements 2 and 3. Because the lower indexes of the plastic materials make corrections more difficult, the objective is stopped down to f/3.5. The overall length is 272 mm.

EXAMPLE V

Example V is the same as Example IV except that plastic is substituted for the first element. For proper power distributions the first element then has the following characteristics: $N_1$=1.49, $V_1$=57.4, $R_1$=162 mm., $R_2$=975 mm. and $t_1$=18.7. Relative aperture is again f/3.5.

EXAMPLE VI

E.F. from 68mm. to 147 mm.  $f/2$

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ =+214 | $t_1$=20.3 |
|   |   |   |   | $R_2$=+1,280 | $S_1$=91 to 9.2 |
| II | 2 | $N_2$=1.57 | $V_2$=57.4 | $R_3$=−282 | $t_2$=94 |
|   |   |   |   | $R_4$ =+128 | $S_2$=22.4 to 145 |
|   |   |   |   | $R_5$ =+135 |   |
| III | 3 | $N_3$=1.70 | $V_3$=56.2 |   | $t_3$=24.4 |
|   |   |   |   | $R_6$ =−98.5 |   |
|   | 4 | $N_4$=1.69 | $V_4$=30.9 |   | $t_4$=6.03 |
|   |   |   |   | $R_7$ =−527 | $S_3$=96.2 to 55.3 |
|   |   |   |   | $R_8$ =+65.5 |   |
|   | 5 | $N_5$=1.62 | $V_5$=54.9 |   | $t_5$=11.7 |
|   |   |   |   | $R_9$ =−212 |   |
|   |   |   |   |   | $S_4$=2.8 |
|   |   |   |   | $R_{10}$=−69.5 |   |
| IV | 6 | $N_6$=1.62 | $V_6$=36.6 |   | $t_6$=20.3 |
|   |   |   |   | $R_{11}$=+51.8 |   |
|   |   |   |   |   | $S_5$=2.6 |
|   |   |   |   | $R_{12}$=+85.2 |   |
|   | 7 | $N_7$=1.61 | $V_7$=58.8 |   | $t_7$=15.3 |
|   |   |   |   | $R_{13}$=−56.6 |   |

The overall length of an objective made according to Example VI is 320 mm. It is made somewhat longer than the first three examples in order to increases $S_3$ to allow for insertion of a viewfinder beamsplitter. Even with such lengthening, the objective is substantially smaller than prior linear motion objectives without a viewfinder element.

In each of the above examples, component III is moved approximately fifty percent as far as component II. For maximum compactness in such objectives, the powers of components II and III, disregarding sign, are best kept within 10% of each other. More compactness could be gained by further increasing the power of component III and moving it still less, say 20% as far as component II. I have found that such a power distribution results in inferior corrections for curvature of field. For most purposes, it is not worthwhile sacrificing the excellent corrections in the examples for the small gain in compactness thus available.

Similarly, I have found that certain improvements in compactness over prior art can be gained by moving component III considerably more than in the examples, for example, 80% as far or 200% as far as component II. In each case the gain in compactness over objectives made according to FIG. 1 is worthwhile but significantly less than in the objectives made according to the examples. At the same time corrections are no better for such objectives than for those of the examples. In fact, contrary to expectations, objectives made according to the examples had better corrections than any others considered, including those made according to FIG. 1.

Thus, I have found that for maximum compactness with excellent corrections moving component III opposite to and 40% to 60% as much as component II gives the best results among four component linear motion objectives.

The invention has been described in considerable detail with particular reference to certain preferred embodiments thereof, but it will be understood that variations and modifications can be effected within the spirit and scope of the invention as described hereinbefore and as defined in the appended claims.

I claim:

1. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 66.7 mm. to 150 mm.  $f/2$

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ =+194 | $t_1$=18.4 |
|   |   |   |   | $R_2$ =+1,180 | $S_1$=86.4 to 8.3 |
| II | 2 | $N_2$=1.57 | $V_2$=57.4 | $R_3$=−370 | $t_2$=6.34 |
|   |   |   |   | $R_4$ =+101 | $S_2$=16.0 to 133 |
|   |   |   |   | $R_5$ =+123 |   |
| III | 3 | $N_3$=1.70 | $V_3$=56.2 |   | $t_3$=22.2 |
|   |   |   |   | $R_6$ =−89.5 |   |
|   | 4 | $N_4$=1.69 | $V_4$=30.9 |   | $t_4$=5.55 |
|   |   |   |   | $R_7$ =−474 | $S_3$=68.2 to 29.2 |
|   |   |   |   | $R_8$ =+73.5 |   |
|   | 5 | $N_5$=1.62 | $V_5$=55.1 |   | $t_5$=14.3 |
|   |   |   |   | $R_9$ =−266 |   |
|   |   |   |   |   | $S_4$=2.33 |
|   |   |   |   | $R_{10}$=−90.6 |   |
| IV | 6 | $N_6$=1.62 | $V_6$=36.6 |   | $t_6$=26.2 |
|   |   |   |   | $R_{11}$=+53.1 |   |
|   |   |   |   |   | $S_5$=1.78 |
|   |   |   |   | $R_{12}$=+93.2 |   |
|   | 7 | $N_7$=1.61 | $V_7$=58.8 |   | $t_7$=16.0 |
|   |   |   |   | $R_{13}$=−65.0 |   | wherein, from front to rear, the lens elements are numbered from 1 to 7, the indexes of refraction are for the D line of the spectrum and are numbered from $N_1$ to $N_7$, the dispersive indexes are numbered from $V_1$ to $V_7$, the radii are numbered from $R_1$ to $R_{13}$, the thicknesses are numbered from $t_1$ to $t_7$ and the air-spaces are numbered from $S_1$ to $S_5$.

2. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 66.7 mm. to 150 mm.  $f/2$

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ =+197 | $t_1$=18.8 |
|   |   |   |   | $R_2$ =+1,190 | $S_1$=84 to 8.6 |
| II | 2 | $N_2$=1.57 | $V_2$=57.4 | $R_3$ =−261 | $t_2$=8.2 |
|   |   |   |   | $R_4$ =+118 | $S_2$=21 to 134 |
|   |   |   |   | $R_5$ =+125 |   |
| III | 3 | $N_3$=1.70 | $V_3$=56.2 |   | $t_3$=22.6 |
|   |   |   |   | $R_6$ =−91.0 |   |
|   | 4 | $N_4$=1.69 | $V_4$=30.9 |   | $t_4$=5.5 |
|   |   |   |   | $R_7$ =−485 | $S_3$=81.2 to 43.5 |
|   |   |   |   | $R_8$ =+69.4 |   |
|   | 5 | $N_5$=1.62 | $V_5$=55.1 |   | $t_5$=13.5 |
|   |   |   |   | $R_9$ =−251 |   |
|   |   |   |   |   | $S_4$=2.4 |
|   |   |   |   | $R_{10}$=−79.1 |   |
| IV | 6 | $N_6$=1.62 | $V_6$=36.6 |   | $t_6$=22.0 |
|   |   |   |   | $R_{11}$=+54.3 |   |
|   |   |   |   |   | $S_5$=2.8 |
|   |   |   |   | $R_{12}$=+87.5 |   |
|   | 7 | $N_7$=1.61 | $V_7$=58.8 |   | $t_7$=15.1 |
|   |   |   |   | $R_{13}$=−65.5 |   | wherein, from front to rear, the lens elements are numbered from 1 to 7, the indexes of refraction for the D line of the spectrum are numbered from $N_1$ to $N_7$, the dispersive indexes are numbered from $V_1$ to $V_7$, the radii are numbered from $R_1$ to $R_{13}$, the thicknesses are numbered from $t_1$ to $t_7$ and the airspaces are numbered from $S_1$ to $S_5$.

3. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 68 mm. to 147 mm.    f/2.7

| Component | Element | $N_1$-$N_6$ | $V_1$-$V_6$ | Radius, mm. | Thickness or Separation, mm. |
|---|---|---|---|---|---|
| I | 1 | $N_1$=1.61 | $V_1$=58.8 | $R_1$ =+197 | $t_1$=18.8 |
|   |   |   |   | $R_2$ =+1,190 | $S_1$=84 to 8.6 |
| II | 2 | $N_2$=1.57 | $V_2$=42.5 | $R_3$ =−261 | $t_2$=8.2 |
|   |   |   |   | $R_4$ =+118 | $S_2$=22.5 to 135 |
| III | 3 | $N_3$=1.70 | $V_3$=56.2 | $R_5$ =+125 | $t_3$=18.2 |
|   |   |   |   | $R_6$ =−479 | $S_3$=86 to 48.3 |
| IV | 4 | $N_4$=1.49 | $V_4$=57.4 | $R_7$ =+55.4 | $t_4$=12.4 |
|   |   |   |   | $R_8$ =−200 | $S_4$=2.9 |
|   | 5 | $N_5$=1.57 | $V_5$=36.6 | $R_9$ =−73.0 | $t_5$=18.2 |
|   |   |   |   | $R_{10}$=+50.2 | $S_5$=2.9 |
|   | 6 | $N_6$=1.61 | $V_6$=58.8 | $R_{11}$=+87.5 | $t_6$=15.9 |
|   |   |   |   | $R_{12}$=−65.5 | | wherein, from front to rear, the lens elements are numbered from 1 to 6, the indexes of refraction for the D line of the spectrum are numbered from $N_1$ to $N_6$, the dispersive indexes are numbered from $V_1$ to $V_6$, the radii are numbered from $R_1$ to $R_{12}$, the thicknesses are numbered from $t_1$ to $t_6$ and the airspaces are numbered from $S_1$ to $S_5$.

4. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 68 mm. to 147 mm.    f/2

| Component | Element | $N_1$-$N_7$ | $V_1$-$V_7$ | Radius, mm. | Thickness or Separation, mm. |
|---|---|---|---|---|---|
| I | 1 | $N_1$=1.61 | $V_1$=58.8 | $R_1$ =+214 | $t_1$=20.3 |
|   |   |   |   | $R_2$ =+1,280 | $S_1$=91 to 9.2 |
| II | 2 | $N_2$=1.57 | $V_2$=57.4 | $R_3$ =−282 | $t_2$=94 |
|   |   |   |   | $R_4$ =+128 | $S_2$=22.4 to 145 |
| III | 3 | $N_3$=1.70 | $V_3$=56.2 | $R_5$ =+135 | $t_3$=24.4 |
|   | 4 | $N_4$=1.69 | $V_4$=30.9 | $R_6$ =−98.5 | $t_4$=6.03 |
|   |   |   |   | $R_7$ =−527 | $S_3$=96.2 to 55.3 |
| IV | 5 | $N_5$=1.62 | $V_5$=54.9 | $R_8$ =+65.5 | $t_5$=11.7 |
|   |   |   |   | $R_9$ =−212 | $S_4$=2.8 |
|   | 6 | $N_6$=1.62 | $V_6$=36.6 | $R_{10}$=−69.5 | $t_6$=20.3 |
|   |   |   |   | $R_{11}$=+51.8 | $S_5$=2.6 |
|   | 7 | $N_7$=1.61 | $V_7$=58.8 | $R_{12}$=+85.2 | $t_7$=15.3 |
|   |   |   |   | $R_{13}$=−56.6 | | wherein, from front to rear, the lens elements are numbered from 1 to 7, the indexes of refraction for the D line of the spectrum are numbered from $N_1$ to $N_7$, the dispersive indexes are numbered from $V_1$ to $V_7$, the radii are numbered from $R_1$ to $R_{13}$, the thicknesses are numbered from $t_1$ to $t_7$ and the air-spaces are numbered from $S_1$ to $S_5$.

5. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 66 mm. to 151 mm.    f/3.5

| Component | Element | $N_1$-$N_6$ | $V_1$-$V_6$ | Radius, mm. | Thickness or Separation, |
|---|---|---|---|---|---|
| I | 1 | $N_1$=1.61 | $V_1$=58.8 | $R_1$ =+202 | $t_1$=19.3 |
|   |   |   |   | $R_2$ =+1,220 | $S_1$=93.9 to 11.4 |
| II | 2 | $N_2$=1.57 | $V_2$=36.6 | $R_3$ =−264 | $t_2$=8.5 |
|   |   |   |   | $R_4$ =+119 | $S_2$=11.3 to 136 |
| III | 3 | $N_3$=1.49 | $V_3$=57.4 | $R_5$ =+90.5 | $t_3$=13.4 |
|   |   |   |   | $R_6$ =−342 | $S_3$=72.4 to 31.2 |
| IV | 4 | $N_4$=1.49 | $V_4$=57.4 | $R_7$ =+56.6 | $t_4$=12.7 |
|   |   |   |   | $R_8$ =−200 | $S_4$=3.0 |
|   | 5 | $N_5$=1.57 | $V_5$=36.6 | $R_9$ =−74.5 | $t_5$=18.6 |
|   |   |   |   | $R_{10}$=+51.3 | $S_5$=2.9 |
|   | 6 | $N_6$=1.61 | $V_6$=58.8 | $R_{11}$=+89.8 | $t_6$=16.3 |
|   |   |   |   | $R_{12}$=−67.0 | | wherein, from front to rear, the lens elements are numbered from 1 to 6, the indexes of refraction for the D line of the spectrum are numbered from $N_1$ to $N_6$, the dispersive indexes are numbered from $V_1$ to $V_6$, the radii are numbered from $R_1$ to $R_{13}$, the thicknesses are numbered from $t_1$ to $t_6$ and the air-spaces are numbered from $S_1$ to $S_5$.

6. A zoom objective having a zoom portion and a relay, the zoom portion having a front positive component, a middle negative component and a rear positive component and being coupled for movement in opposite directions at relative axial rates of approximately 2 to 1, respectively, said objective being constructed according to the following table:

E.F. from 66 mm. to 151 mm.    f/3.5

| Component | Element | $N_1$-$N_6$ | $V_1$-$V_6$ | Radius, mm. | Thickness or Separation, mm |
|---|---|---|---|---|---|
| I | 1 | $N_1$=1.49 | $V_1$=57.4 | $R_1$ =+162 | $t_1$=18.7 |
|   |   |   |   | $R_2$ =+975 | $S_1$=93.9 to 11.4 |
| II | 2 | $N_2$=1.57 | $V_2$=36.6 | $R_3$ =−264 | $t_2$=8.5 |
|   |   |   |   | $R_4$ =+119 | $S_2$=11.3 to 136 |
| III | 3 | $N_3$=1.49 | $V_3$=57.4 | $R_5$ =+90.5 | $t_3$=13.4 |
|   |   |   |   | $R_6$ =−342 | $S_3$=72.4 to 31.2 |
| IV | 4 | $N_4$=1.49 | $V_4$=57.4 | $R_7$ =+56.6 | $t_4$=12.7 |
|   |   |   |   | $R_8$ =−200 | $S_4$=3.0 |
|   | 5 | $N_5$=1.57 | $V_5$=36.6 | $R_9$ =−74.5 | $t_5$=18.6 |
|   |   |   |   | $R_{10}$=+51.3 | $S_5$=2.9 |
|   | 6 | $N_6$=1.61 | $V_6$=58.8 | $R_{11}$=+89.8 | $t_6$=16.3 |
|   |   |   |   | $R_{12}$=−67.0 | | wherein, from front to rear, the lens elements are numbered from 1 to 6, the indexes of refraction for the D line of the spectrum are numbered from $N_1$ to $N_6$, the dispersive indexes are numbered from $V_1$ to $V_6$, the radii are numbered from $R_1$ to $R_{12}$, the thicknesses are numbered from $t_1$ to $t_6$ and the air-spaces are numbered from $S_1$ to $S_5$.

References Cited
FOREIGN PATENTS 622,046   1/1938   Germany.
943,180   12/1963  Great Britain.

JOHN K. CORBIN, *Primary Examiner.*

U.S. Cl. X.R.

350—215